United States Patent [19]

Jackson

[11] 4,424,997

[45] Jan. 10, 1984

[54] FOLDABLE DIGGING TOOL

[75] Inventor: Milan D. Jackson, Oregon City, Oreg.

[73] Assignee: U-Dig-It Enterprises, Inc., Boring, Oreg.

[21] Appl. No.: 443,436

[22] Filed: Nov. 22, 1982

[51] Int. Cl.³ ............................................. A01A 1/22
[52] U.S. Cl. ................................................ 294/53.5
[58] Field of Search .............. 294/53.5, 54, 57, 59, 294/49, 51, 123, 1 BA, 50.6, 50.8; 15/104.8, 257.1, 257.4, 257.6, 257.7; 56/400.18, 400.19, 400.20; 172/372-375; 7/1 L, 16, 14, 55; 24/232-234

[56] References Cited

U.S. PATENT DOCUMENTS

| | | | |
|---|---|---|---|
| 3,456,663 | 7/1969 | Blum | 294/53.5 |
| 3,473,712 | 10/1969 | Genchi | 224/234 |
| 3,993,340 | 11/1976 | Rusing et al. | 294/53.5 |

Primary Examiner—James B. Marbert
Attorney, Agent, or Firm—Jack E. Day

[57] ABSTRACT

The present invention is a foldable demountable digging tool that is reasonable in cost, simple and rugged in construction, small in size and light in weight, and safe and easy to carry and use. These features are obtained by pivotally attaching a holding member to one end of a digging member, permitting the holding member to be folded into the concave side of the digging member, with the handle end of the holding member slightly overlapping the pointed end of the digging member. The folding action permits the tool to be reduced in length to approximately one-half of its opened length.

8 Claims, 5 Drawing Figures

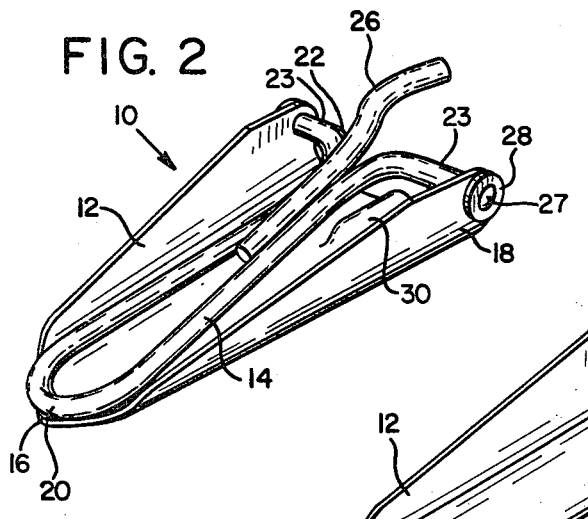
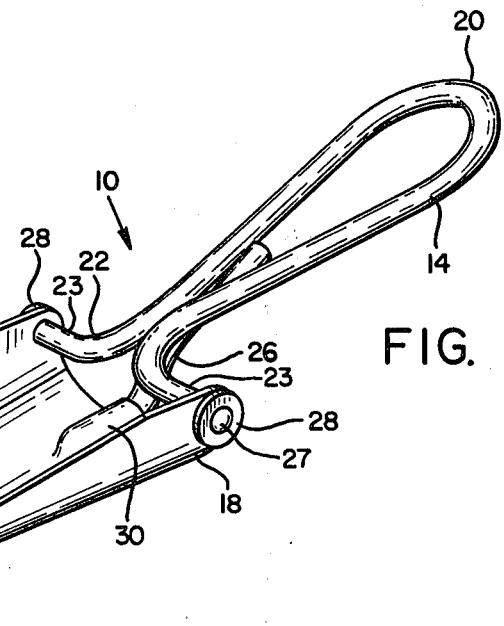
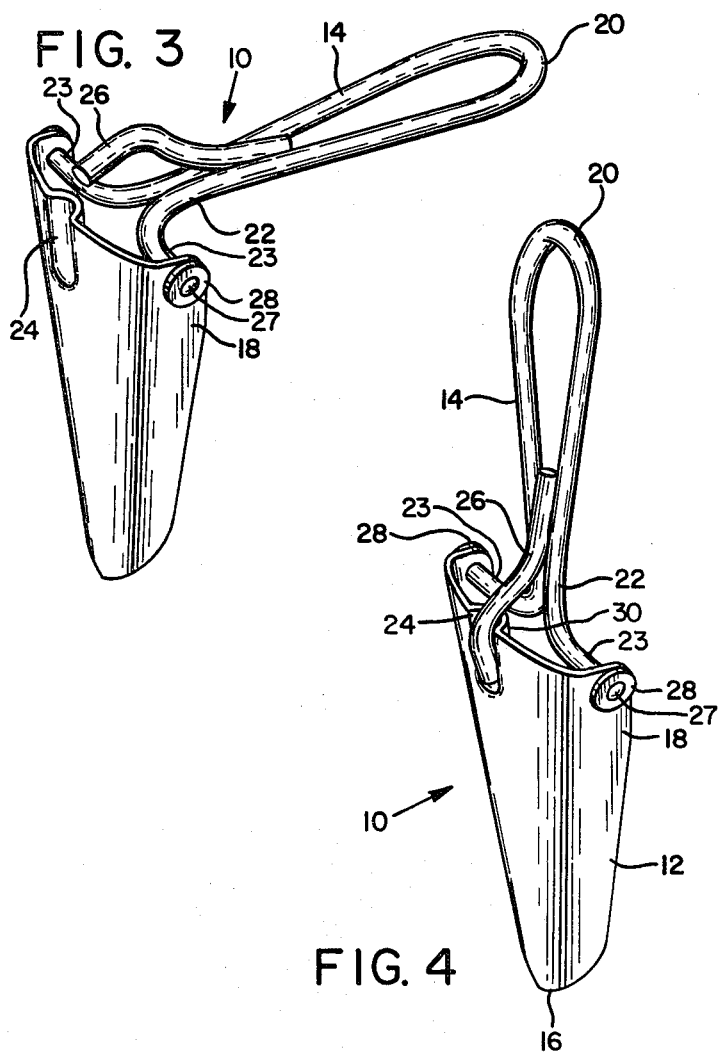
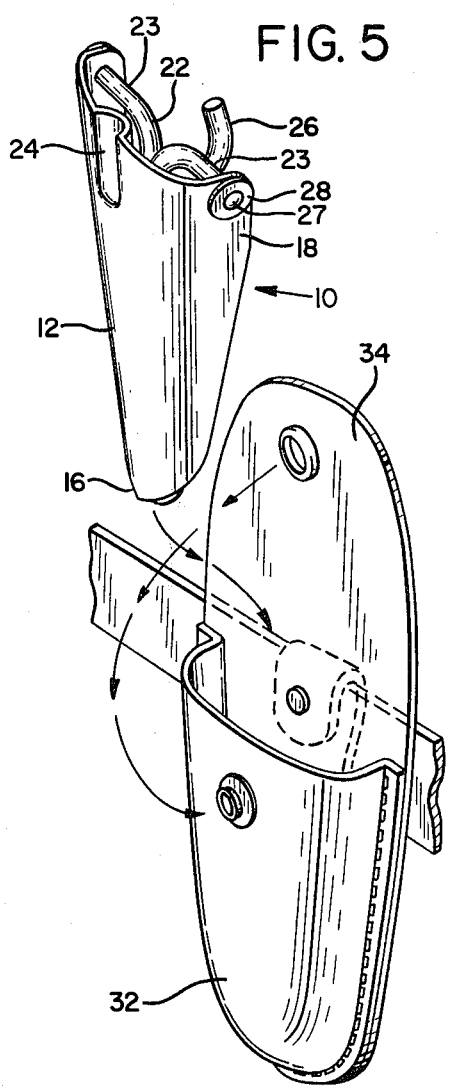

FOLDABLE DIGGING TOOL

BACKGROUND OF THE INVENTION

Two recent trends in social behavior and social goals combine to make the present invention desirable.

The first trend is exemplified by an upsurge of interest in obtaining first-hand experience in the "great outdoors" by hiking into wilderness areas and other less-frequented places, and by visiting the less crowded beaches and the like. This interest has resulted in an enormous increase in the number of persons visiting such areas which, unfortunately, means an increase in the amount of waste, particularly human and pet waste and excrement, which is discarded and deposited in these places. Besides posing a serious health hazard because of the increase in the number of flies and other disease-carrying insects and rodents attracted by waste, the presence of such waste is distinctly unpleasant to other visitors, as has been the experience of many in recent years.

The above-described increase in waste-producing activities collides head-on with the goals of the second trend, which is the increased emphasis on reducing environmental pollution. In the case of the aforementioned outdoor activities, efforts have been made to limit the number of visitors to the remote areas, require visitors to carry digging tools for burying their waste, restrict the taking of pets to certain areas such as public beaches, and the like. Public toilets have been constructed in remote areas, even though this tends to reduce the "wildness" of an area. This latter expedient is expensive to initiate and maintain, as vehicular access is almost never available to some of the more remote areas, and all materials must be packed in and out personally or by pack animal. Guarding against vandalism is also difficult. Such facilities do not help to alleviate the problem of pet excrement, in any case.

Some authorities responsible for the oversight of such areas encourage or require that visitors to these areas carry digging tools with which to bury their waste, but such requirements are difficult to enforce because tools adequate for such purposes have been, up to now, both expensive to purchase and cumbersome to carry, especially into some of the more remote areas. Even so, many visitors to such places recognize the problem and attempt to do something about it, but it is difficult to carry a shovel or other tool of sufficient sturdiness to solve the problem on an extended outing.

What is needed is a compact hand-held digging tool that is sturdy, reliable, efficient, easily carried on even long hikes, and inexpensive enough that it would not be unreasonable on the part of the authorities to require that everyone who is in certain areas, with or without pets, have such a tool on their person at all times.

Few, if any, tools of such characteristics and of a sufficiently small size have been developed in the past. Several efforts have been made to develop full-sized tools with such features, not entirely successfully, however. For example, Blum U.S. Pat. No. 3,456,663 discloses a combined walking cane and scoop, the latter feature specifically for scooping up waste and pet excrement. Although it attempts to solve one aspect of the above stated need, it is not intended as a digging tool, and it would not be convenient to carry, even though reduced in size.

Carlsson Swedish Pat. No. 79,381 discloses a digging shovel incorporating a pivot mechanism enabling the blade to be folded forward to an angle of about 45° to the handle to facilitate carrying and storing. Although this disclosure specifically relates to a foldable digging tool, it would not be convenient for carrying under the conditions outlined above, even were it to be reduced in size.

Stritter U.S. Pat. No. 801,557 discloses a post hole shovel which folds to facilitate removing the loosened dirt from a hole. The blade maintains a proper position to be inserted into the earth, but then can be folded to an angle of 90° to the handle by action of the handle so that the loosened earth can be withdrawn thereby. The blade does not fold into a convenient position for carrying, even if the tool were reduced to a convenient size.

Williams U.S. Pat. No. 2,781,711 discloses a trowel-sized, hand-held, multi-purpose tool, in which the blade pivots to a number of different positions for different garden tasks. However, it does not fold into a small size or convenient configuration that would make it easy to carry on extended trips into wilderness areas, or even on a public beach with pets.

Albers U.S. Pat. No. 261,894 discloses a manure fork that can be converted into a rake-like tool by pivoting the tine portion of the tool into a 90° angle to the handle, in somewhat the same way that Blum or Stritter, above, pivot their respective blades about their respective handle. Even reducing Albers in size would not convert it into a useful or convenient tool for the purposes described above.

Bengtsson U.S. Pat. No. 993,015 discloses a military intrenching tool which has a shovel-like blade that can be detached from the handle to use as a shield against bayonets, bullets or other weapons. Bengtsson does not disclose any means for pivoting the blade against the handle in order that the tool may be more easily and conveniently carried.

SUMMARY OF THE PRESENT INVENTION

The present invention overcomes the aforementioned difficulties and drawbacks of prior foldable and demountable digging tools by providing a device which is reasonable in cost, simple and rugged in construction, small in size and light in weight, and safe and easy to carry and use. These features are obtained by pivotally attaching a holding member to one end of a digging member, permitting the holding member to be folded into the concave side of the digging member, with the handle end of the holding member slightly overlapping the pointed end of the digging member, thus providing protection against accidental injury by said pointed end. The folding action permits the tool to be reduced in length to approximately one-half of its opened length.

BRIEF DESCRIPTION OF THE DRAWINGS

FIG. 1 is a perspective view of an illustrative embodiment of the invention, as used.

FIG. 2 is a perspective view of an illustrative embodiment of the invention, folded for carrying and/or storage.

FIG. 3 is a perspective view of the invention from the underside, with the handle partially opened, disclosing the mechanical stop for maintaining the handle in a fixed relationship with the digging member when in use.

FIG. 4 is a perspective view of the invention from the underside, depicting it in fully open position.

FIG. 5 is a perspective view of an illustrative embodiment of the invention and a carrying case, disclosing how the invention can be stored and carried between uses.

DETAILED DESCRIPTION OF A PREFERRED EMBODIMENT OF THE INVENTION

Turning now to FIG. 1, we see the digging tool 10, comprising a digging member or blade 12, pivotally fastened to a holding member 14, as hereinafter more completely described. The digging end or tip 16 of the blade 12 is more-or-less pointed to provide efficient digging in hard or even rocky soil. The blade 12 can be formed into a broad oval shape with a first fastening end 18 pierced by holes 25 so that it can be pivotally fastened to the second fastening end 22 of the holding member 14. The handle end 20 of the holding member 14 is shaped to fit comfortably into the palm of the user's hand. The second fastening end 22 of the holding member 14 incorporates the shafts 23 which extend through the holes 25 to provide a pivoting axis for the holding member 14 and the blade 12, so that the holding member 14 pivots into the concave side of the blade 12, as depicted in FIG. 2, providing a compact and convenient configuration for carrying.

A particularly desirable feature of the invention is that the handle end 20 of the holding member 14, in folded position, slightly overlaps the digging end 16 of the blade 12, protecting the user from a possibly severe wound in case he or she were to fall against the folded tool while carrying it in a pocket, unprotected by a carrying case or sheath 32, such as depicted in FIG. 5, hereinafter to be more fully described.

FIG. 3 discloses the digging tool 10 in a partially opened position, as seen from the underside of the tool. A cylindrical concavity 24 is formed into the fastening end 18 of the blade 12, to receive a mechanical stop 26, for the purpose of maintaining the holding member 14 in fixed relationship with the digging member 12 during use. The other side of the concavity 24 is the cylindrical convexity 30, to be seen in FIGS. 1 and 2.

FIG. 4 depicts the digging tool 10 in a fully opened position, as seen from the underside. It discloses how the mechanical stop 26 nestles into the concavity 24 to provide a fixed position of the tool 10 when used.

FIG. 5 depicts the tool 10 in closed position, in which configuration it can be carried in a pocket of the user or, preferably inserted into a carrying case or sheath 32 having a flap 34 which can be folded over the top of the case and fastened by any convenient means, such as by a snap fastener, as shown. The sheath 32 can be carried in any of several ways, such as in a pack or pocket, fastened to the clothing of the user or, preferably, carried on the user's belt by a loop or clip as shown.

The handle 14 can be fastened to the blade 12 by any convenient pivoting means. An illustrative method is depicted in all of FIGS. 1-5, wherein two shafts 23 are formed at right angles to the plane of the holding member 14 and the ends 27 of said shafts 23 are extended through holes 25. A washer 28 can be placed thereby over the ends 27 of said shafts 23 and affixed thereto by any of several means, including welding, peening, or the like. If the upturned sides of the digging member or blade 12 are squeezed together slightly at the time washers 28 are affixed to the ends 27 of the shafts 23, an outward pressure will be exerted on the washers 28 when the squeezing is ended, creating a frictional resistance of the pivoting means to unwanted pivoting of the digging member or blade 12 with respect to the holding member 14 while the tool 10 is being used.

In the preferred embodiment depicted in FIGS. 1-5, the metal rod forming the holding member 14 can be squeezed together before the rod ends are turned outwardly to form the shafts 23, and the squeezed portion of the rod can be fastened together by any convenient method, such as by welding or by clamping, to provide stiffness and strength to said holding member 14 in conditions of severe use, such as when digging a hole in rocky or hard compacted soil, or the like. The mechanical stop 26 can also be fastened to the holding member 14 by any convenient method that will enable it to maintain its position and rigidity in such severe use, for example, by welding or forging.

The construction of the digging tool of the present invention is not intended to be limited to fabrication from metal rods and sheets, as depicted in the drawing or inferred from the foregoing description. It could be formed of any suitable materials or by any suitable process, as by casting or forging in metals, or by molding of any of several high-impact plastics, such as those used to form wood-splitting wedges such as are now available.

The features and advantages of the invention as described above are not to be construed as depending upon the precise forms, materials or fabrication processes or techniques therein described. The terms and expressions employed therein are used as terms of description and not terms of limitation, and there is no intention of excluding thereby equivalents of the features described or shown, or any portions thereof, it being recognized that the scope of the invention is defined and limited only by the claims which follow.

What is claimed is:

1. A foldable hand-held digging tool having an open position and a closed position, and consisting essentially of:
    a. a digging member and a holding member;
    b. said digging member having a digging end and a first fastening end, said first fastening end having a first stop means incorporated therewith;
    c. said holding member having a handle end and a second fastening end, said second fastening end having a second stop means incorporated therewith;
    d. pivoting means connecting said first fastening end to said second fastening end; and
    e. said first stop means engaging said second stop means when said digging tool is in said open position.

2. The digging tool of claim 1 wherein said digging member has a concave surface and a convex surface and said first stop means is a cylindrical concavity formed in said convex surface, said second stop means being a cylindrical extension fitting into said first stop means.

3. The digging tool of claim 1 wherein said pivoting means comprises two shaft ends extending oppositely and transversely from said second fastening end and being rigidly connected thereto, said shaft ends extending through apertures located axially and oppositely in said first fastening end of said digging member.

4. The digging tool of claim 1 wherein said first stop means is a dimpled depression is said first fastening end of said digging member, and said second stop means is a resilient member sliding into said dimpled depression.

5. The digging tool of claim 3 wherein said pivoting means consists of two shaft ends extending oppositely and transversely through two apertures located oppositely and axially in said second fastening end of said digging member, said shaft ends being an extension of said first fastening end of said holding member.

6. The digging tool of claim 1 wherein said first stop means clampingly engages said second stop means.

7. A foldable hand-held digging tool having an open position and a closed position, and consisting essentially of:
 a. a digging member and a holding member;
 b. said digging member having a digging end and a first fastening end, said first fastening end having a stop means incorporated thereon;
 c. said holding member having a handle end and a second fastening end;
 d. pivoting means connecting said first fastening end to said second fastening end; and
 e. said stop means engaging said holding member when said digging tool is in open position.

8. The digging tool of claim 7 wherein said stop means engages said holding member by a clamping action.

* * * * *